(12) United States Patent
Sah

(10) Patent No.: US 7,015,949 B1
(45) Date of Patent: Mar. 21, 2006

(54) METHOD AND APPARATUS FOR HOSTING A NETWORK CAMERA WITH REFRESH DEGRADATION

(75) Inventor: Adam D. Sah, Berkeley, CA (US)

(73) Assignee: IPIX Corporation, Reston, VA (US)

( * ) Notice: Subject to any disclaimer, the term of this patent is extended or adjusted under 35 U.S.C. 154(b) by 905 days.

(21) Appl. No.: 09/835,033

(22) Filed: Apr. 12, 2001

(51) Int. Cl.
H04N 5/225 (2006.01)
H04N 5/232 (2006.01)
H04N 9/00 (2006.01)
H04N 7/14 (2006.01)
G06F 15/173 (2006.01)

(52) U.S. Cl. .............................. 348/207.1; 348/211.1; 348/14.08; 709/223; 725/10

(58) Field of Classification Search ............ 348/207.1, 348/211.1, 14.08, 143, 153–159; 709/223–229, 709/233; 725/10, 105
See application file for complete search history.

(56) References Cited

U.S. PATENT DOCUMENTS

| | | |
|---|---|---|
| 5,268,668 A | 12/1993 | Berube |
| 5,627,586 A | 5/1997 | Yamasaki |
| 5,732,146 A | 3/1998 | Yamada et al. |
| 5,808,219 A | 9/1998 | Usa |
| 5,809,161 A | 9/1998 | Auty et al. |
| 5,864,366 A | 1/1999 | Yeo |
| 5,867,484 A | 2/1999 | Shaunfield |
| 5,870,471 A | 2/1999 | Wootton et al. |
| 5,875,108 A | 2/1999 | Hoffberg et al. |
| 5,875,305 A | 2/1999 | Winter et al. |
| 5,884,042 A | 3/1999 | Winter et al. |
| 5,961,599 A | 10/1999 | Kalavade et al. |
| 5,987,621 A | 11/1999 | Duso et al. |
| 6,002,995 A | 12/1999 | Suzuki et al. |
| 6,034,652 A | 3/2000 | Freiberger et al. |
| 6,035,323 A | 3/2000 | Narayen et al. |
| 6,038,598 A | 3/2000 | Danneels |
| 6,061,088 A | 5/2000 | Khosravi et al. |
| 6,061,715 A | 5/2000 | Hawes |
| 6,067,571 A | 5/2000 | Igarashi et al. |
| 6,072,504 A | 6/2000 | Segen |
| 6,075,787 A | 6/2000 | Bobeck et al. |
| 6,076,104 A | 6/2000 | McCue |
| 6,088,330 A | 7/2000 | Bruck et al. |
| 6,088,622 A | 7/2000 | Dollin et al. |
| 6,088,737 A | 7/2000 | Yano et al. |
| 6,091,457 A | 7/2000 | Bril |
| 6,094,453 A | 7/2000 | Gosselin et al. |
| 6,094,662 A | 7/2000 | Hawes |
| 6,097,389 A | 8/2000 | Morris et al. |
| 6,104,705 A * | 8/2000 | Ismail et al. .............. 348/14.08 |
| 6,111,517 A | 8/2000 | Atick et al. |
| 6,112,236 A | 8/2000 | Dollin et al. |
| 6,115,040 A | 9/2000 | Bladow et al. |

(Continued)

OTHER PUBLICATIONS

Co-pending, unrelated U.S. Appl. No. 09/834,719, filed Apr. 12, 2001.

(Continued)

Primary Examiner—David Ometz
Assistant Examiner—Nhan Tran
(74) Attorney, Agent, or Firm—Frost Brown Todd LLC

(57) ABSTRACT

A method and apparatus for providing an improved Internet camera is described. The method of keeping a refreshed image from a camera on a user's system comprises sending the image to the user's system and refreshing the image when a refresh period has elapsed. The method further comprises decreasing a frequency of the refresh after a period of time.

17 Claims, 9 Drawing Sheets

U.S. PATENT DOCUMENTS

| | | |
|---|---|---|
| 6,115,752 A | 9/2000 | Chauhan |
| 6,119,159 A | 9/2000 | Tseng et al. |
| 6,122,661 A | 9/2000 | Stedman et al. |
| 6,125,398 A | 9/2000 | Mirashrafi et al. |
| 6,138,150 A | 10/2000 | Nichols et al. |
| 6,138,164 A | 10/2000 | Kobata et al. |
| 6,175,373 B1 | 1/2001 | Johnson |
| 6,208,376 B1 | 3/2001 | Tanaka et al. |
| 6,363,319 B1 | 3/2002 | Hsu |
| 6,370,656 B1 | 4/2002 | Olarig et al. |
| 6,730,119 B1 | 4/2002 | Basso et al. |
| 6,400,392 B1 | 6/2002 | Yamaguchi et al. |
| 6,434,320 B1 | 8/2002 | Orth et al. |
| 6,452,913 B1 | 9/2002 | Proctor, Jr. |
| 6,476,858 B1 | 11/2002 | Ramirez-Diaz et al. |
| 6,549,948 B1 * | 4/2003 | Sasaki et al. ............... 709/233 |
| 6,570,610 B1 | 5/2003 | Kipust |
| 6,583,813 B1 | 6/2003 | Enright et al. |
| 6,597,393 B1 * | 7/2003 | Kato et al. ............. 348/211.99 |
| 6,618,074 B1 | 9/2003 | Seeley et al. |
| 6,631,402 B1 | 10/2003 | Devine et al. |
| 6,675,386 B1 | 1/2004 | Hendricks et al. |
| 6,693,533 B1 | 2/2004 | Ebata et al. |
| 6,720,990 B1 | 4/2004 | Walker et al. |
| 6,744,767 B1 | 6/2004 | Chiu et al. |
| 6,747,554 B1 | 6/2004 | Higashimura et al. |
| 6,778,496 B1 | 8/2004 | Meempat et al. |
| 6,799,208 B1 | 9/2004 | Sankaranarayan et al. |
| 6,813,312 B1 * | 11/2004 | Tullberg et al. ............ 348/143 |
| 6,891,566 B1 | 5/2005 | Marchese |
| 2001/0019360 A1 * | 9/2001 | Tanaka et al. ........... 348/14.07 |
| 2001/0043722 A1 | 11/2001 | Wildes et al. |
| 2002/0003575 A1 * | 1/2002 | Marchese ............. 348/333.02 |
| 2002/0054212 A1 | 5/2002 | Fukuoka |
| 2002/0067258 A1 | 6/2002 | Lyons et al. |
| 2002/0141619 A1 | 10/2002 | Standridge et al. |
| 2002/0147982 A1 | 10/2002 | Naidoo et al. |
| 2003/0085998 A1 | 5/2003 | Ramirez-Diaz et al. |
| 2003/0108327 A1 | 6/2003 | Sungawa |
| 2003/0184647 A1 | 10/2003 | Yonezawa et al. |

OTHER PUBLICATIONS

Office Action dated Jan. 30, 2004, for U.S. Appl. No. 09/834,719, filed Apr. 12, 2001.

Co-pending, unrelated U.S. Appl. No. 09/834,856, filed Apr. 12, 2001.

Office Action dated Jun. 17, 2004 for U.S. Appl. No. 09/834,856, filed Apr. 12, 2001.

Co-pending, unrelated U.S. Appl. No. 09/834,689, filed Apr. 12, 2001.

Co-pending, unrelated U.S. Appl. No. 09/834,599, filed Apr. 12, 2001.

Office Action dated Aug. 18, 2004 for U.S. Appl. No. 09/834,689, filed Apr. 12, 2001.

Office Action dated Dec. 23, 2004 for U.S. Appl. No. 09/834,856, filed Apr. 12, 2001.

Office Action dated Feb. 22, 2005 for U.S. Appl. No. 09/834,689, filed Apr. 12, 2001.

Office Action dated Jun. 3, 2005 for U.S. Appl. No. 09/834,689, filed Apr. 12, 2001.

Office Action dated May 20, 2005 for U.S. Appl. No. 09/834,856, filed Apr. 12, 2001.

Office Action dated Aug. 9, 2005 for U.S. Appl. No. 09/834,599, filed Apr. 12, 2001.

* cited by examiner

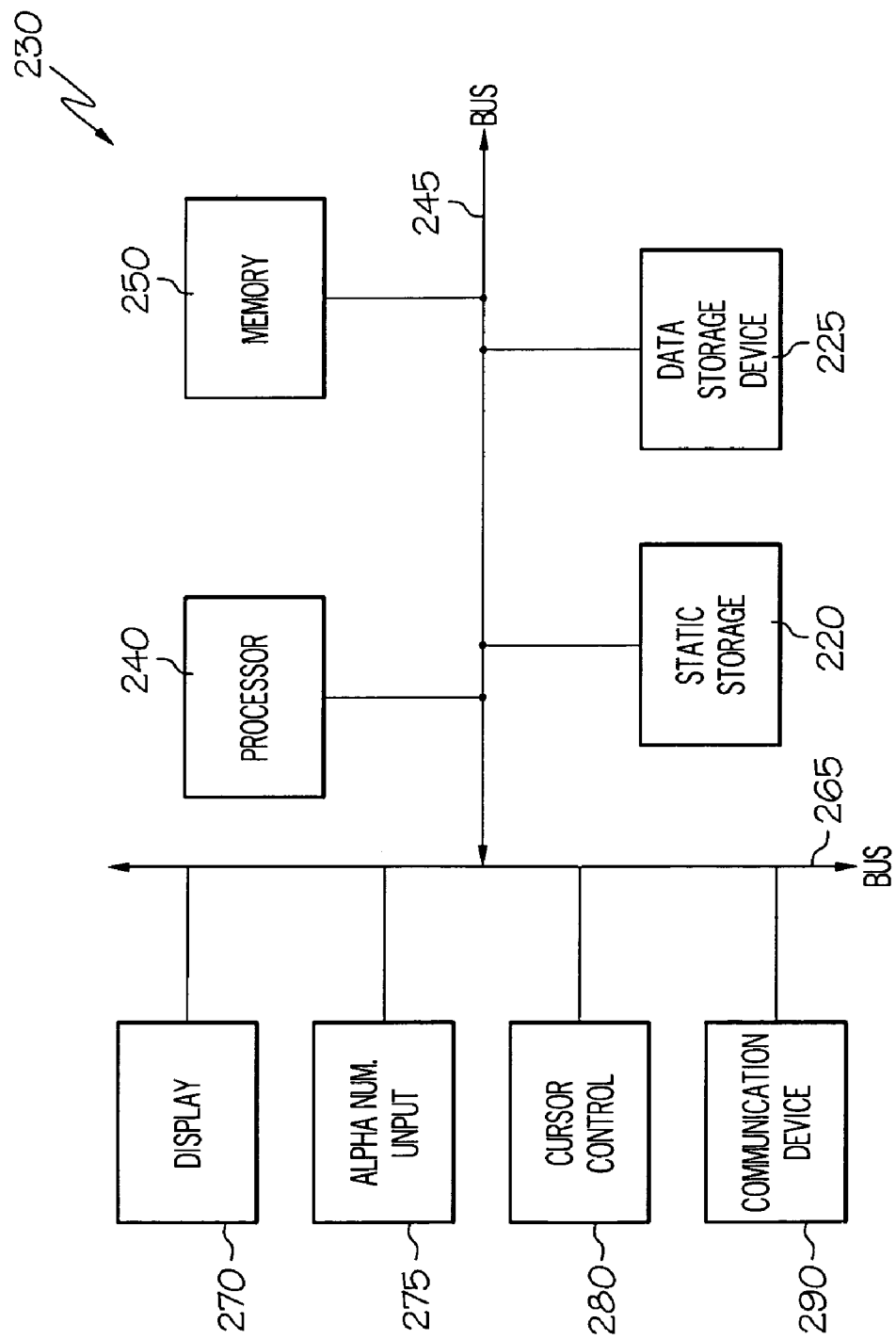

METHOD AND APPARATUS FOR HOSTING A NETWORK CAMERA WITH REFRESH DEGRADATION

FIELD OF THE INVENTION

The present invention relates to images, and more specifically, to Internet based cameras.

BACKGROUND

As the Internet is becoming more prevalent, and users have flat-rate Internet access, the uses of the Internet are expanding. Web cams, cameras that make their images available on the Internet are becoming more prevalent.

Web cams are useful, and fun. They are becoming more common, for example in hotels that want to advertise to prospective customers. Web cams may also be used in other situations, to permit a user to look at a site from a remote location.

However, web cams have a few problems. In general, the image provider pays for bandwidth. This means that if a user loads the web cam, and then leaves, or simply fails to close the window, the image provider is paying each time the image is refreshed. This is disadvantageous to the image provider. One method of reducing this bandwidth is to only send images from the camera if there was motion, or something triggers sending the image. However, determining whether a camera is not sending a picture because it has not been triggered or because it's malfunctioning is difficult.

Therefore, an improved method of interacting with a web cam is needed.

SUMMARY OF THE INVENTION

A method and apparatus for providing an improved Internet camera is described. The method of keeping a refreshed image from a camera on a user's system comprises sending the image to the user's system and refreshing the image when a refresh period has elapsed. The method further comprises decreasing a frequency of the refresh after a period of time.

BRIEF DESCRIPTION OF THE DRAWINGS

The present invention is illustrated by way of example, and not by way of limitation, in the figures of the accompanying drawings and in which like reference numerals refer to similar elements and in which:

FIG. 2 is a block diagram of one embodiment of a computer system that may be used to implement the present system.

DETAILED DESCRIPTION

A method and apparatus for improving functioning of an Internet camera (NetCam or Web cam) is described. For one embodiment, a motion sensor may be included in the camera. In that instance, images are only sent if they are changing. However, this can be disadvantageous, since one may not be able to tell whether a camera ceased functioning or there was no activity in front of that camera. A heartbeat, sent periodically by the camera, resolves this issue.

For one embodiment, a site may include multiple cameras. For one embodiment, only a single view is shown to a user. Thus, a method of dynamically selecting the most interesting of the images would be useful. For one embodiment, the system selects from among the images based on level of movement within the image.

For one embodiment, a user may open a browser window, to view a NetCam image, and fail to close it. The system can, over time, degrade the image, to reduce bandwidth usage. For example, the image size may be reduced. For another embodiment, the image quality may be reduced. By degrading the image, the bandwidth requirements are reduced. For one embodiment, this is based on time. For another embodiment, feedback may indicate whether there has been activity on the user's system, or if the window is covered up.

For one embodiment, if the user has opened a window, and failed to close it, the refresh rate may be decreased. This is an alternative way of reducing bandwidth usage. The criteria may be the same as described above. For one embodiment, the refresh rate is gradually decreased. For another embodiment, the refreshes may be stopped. For one embodiment, for both the image degradation and the refresh slow-down, the user may indicate a preference to reinstate the original image quality/size/refresh rate.

Furthermore, images are sent to the client over a content delivery network (CDN). A content delivery network may be any system that delivers network content, and may be an arbitrary control over which network protocol etc. is used. For one embodiment, data is sent to the client in two portions. The data is sent as a container, which is periodically refreshed, and as an image within the container, which is refreshed more often. For one embodiment, the route taken to the client affects the speed of upload, as well as the bandwidth cost. Thus, based on various factors, the data being refreshed can be rerouted through another CDN. This may be done based on feedback from the client system, based on cost, based on the client's IP address, or other data.

Each of these mechanisms is designed to improve performance of the system, while reducing the cost and/or bandwidth used by the system. This is advantageous as it reduces the cost of providing NetCams, while providing the NetCam experience for users.

Figure 1A:
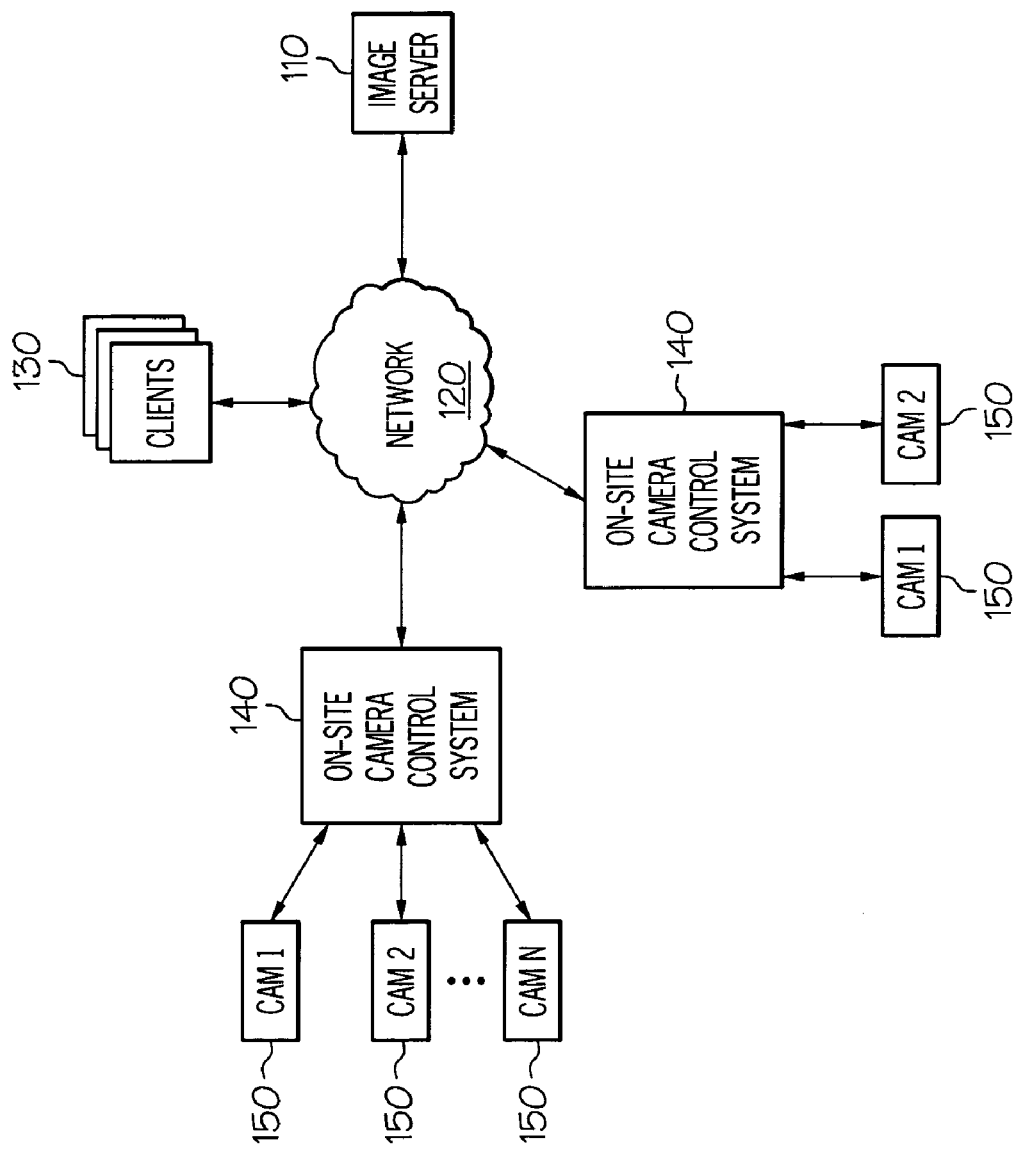
FIG. 1A is a block diagram of one embodiment of a network including the present system.

FIG. 1A is a block diagram of one embodiment of a network including the present system. An image server 110 permits access to images obtained by various cameras 150 by clients 130. The image server 110 may include multiple servers, which serve up various images. Clients 130 access the images through network 120. For one embodiment, network 120 is the Internet. For another embodiment, the network 120 may be a local area network (LAN), wide area network (WAN), or another type of network. Clients 130 receive images served by the image server 110 either directly, or through an intermediate CDN, such as Akamai, EpicRealm, Edgix, SandPiper, or another CDN.

NetCams 150 may be set up on a plurality of sites. For one embodiment, the cameras 150 are addressable through the network 120. For one embodiment, the plurality of cameras 150 is coupled to an on-site camera control system 140. The on-site camera control system 140 permits the cameras 150 to be programmed. The on-site camera control system 140, as will be described in more detail below, sends the images collected from the various cameras 150 to the image server 110. As will be described in more detail below, the on-site camera control system 140 may further perform various functions, to validate the camera functionality. For one embodiment, there is no separate camera control system 140, but the functionality of such as system is included in each camera.

Figure 1B:
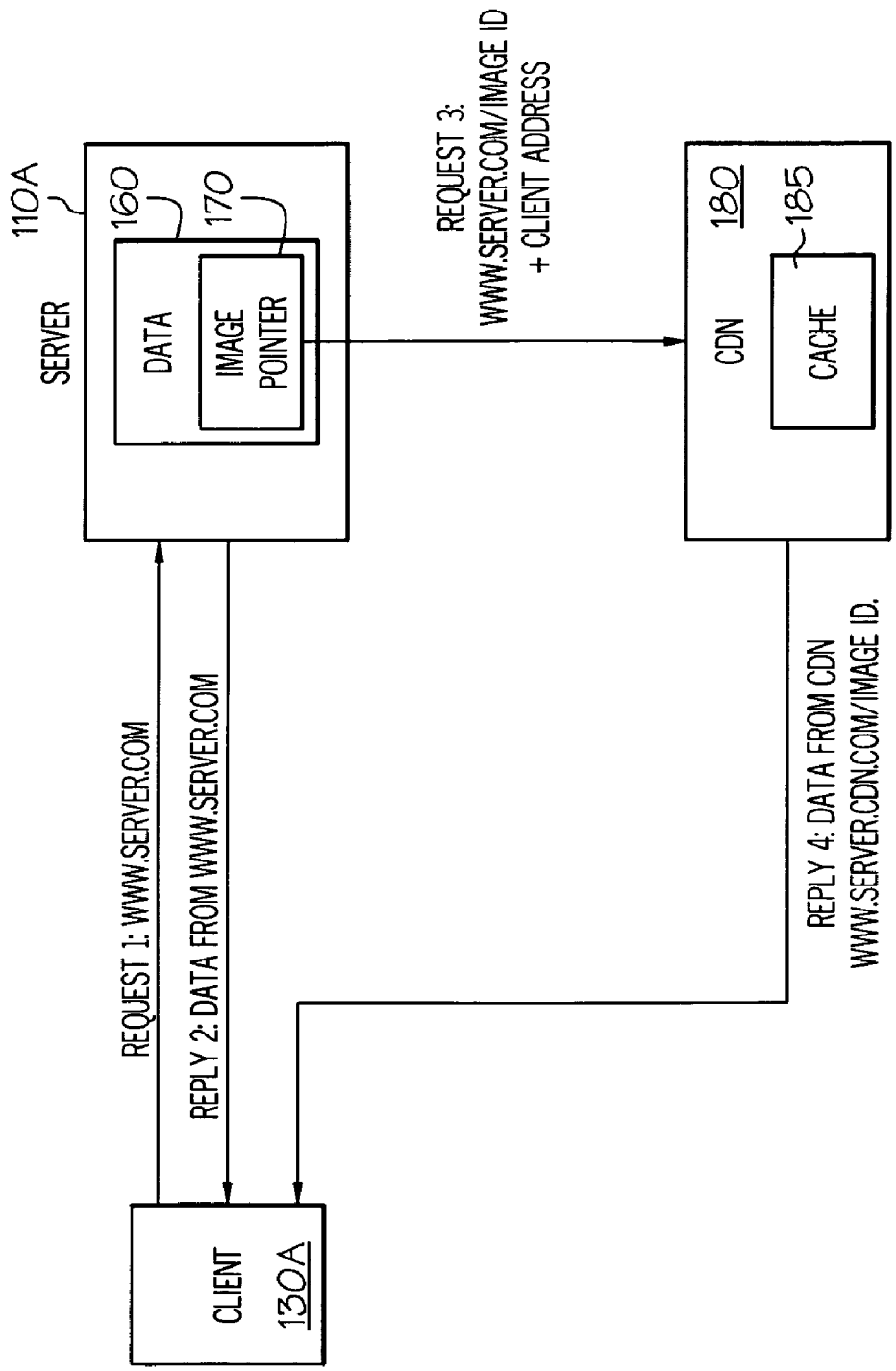
FIG. 1B illustrates one embodiment of a network including a content delivery network (CDN).

FIG. 1B illustrates one embodiment of a network including a content delivery network (CDN). The client 130A connects to a server 110A, which uses CDN 180 to deliver the content to the client 130A. Specifically, client 130A requests a web page or other data from server 110A (shown as request 1). Server 110A may serve portions of the requested data (shown as reply 2), and forwards a request to the CDN 180 (shown as request 3). For one embodiment, the URL for the forwarded request may be www.server.CDN.com/imageID. Alternative formats for the reformatted URL may be used. The CDN 180 includes a data cache 185 storing the data served by the CDN 180. By using a cache 185, the access time to the data is significantly reduced. The CDN 180 looks up the data requested by the server 110A, based on the redirected URL. Alternatively, the request may be to a general URL, with the content of the request indicting the data being requested, and the client requesting it.

The CDN 180 then serves the data to the client 130A, from the redirected URL. (shown as reply 4). The client 130A receives all of the data, combined by the user's browser. Thus, for example, the frame of an image may be delivered by server 110A while a changing image may be served from the image cache 185 by CDN 180. This is transparent to the user, although for one embodiment, the user may see it in the Location box, by seeing the redirected URL. In this way, the load on server 110A is significantly reduced. Additionally, the CDN 180 generally would have a fast connection to the Network, and thus the lag time introduced by the request and look-up of the data would be compensated for by a faster response and loading time. In general, the types of data served by CDN 180 would include image data, video, streaming data of any sort, or any other types of data that is large.

FIG. 2 is one embodiment of computer system that may be used with the present invention. It will be apparent to those of ordinary skill in the art, however that other alternative systems of various system architectures may also be used.

The data processing system illustrated in FIG. 2 includes a bus or other internal communication means 245 for communicating information, and a processor 240 coupled to the bus 245 for processing information. The system further comprises a random access memory (RAM) or other volatile storage device 250 (referred to as memory), coupled to bus 245 for storing information and instructions to be executed by processor 240. Main memory 250 also may be used for storing temporary variables or other intermediate information during execution of instructions by processor 240. The system also comprises a read only memory (ROM) and/or static storage device 220 coupled to bus 245 for storing static information and instructions for processor 240, and a data storage device 225 such as a magnetic disk or optical disk and its corresponding disk drive. Data storage device 225 is coupled to bus 245 for storing information and instructions.

The system may further be coupled to a display device 270, such as a cathode ray tube (CRT) or a liquid crystal display (LCD) coupled to bus 245 through bus 265 for displaying information to a computer user. An alphanumeric input device 275, including alphanumeric and other keys, may also be coupled to bus 245 through bus 265 for communicating information and command selections to processor 240. An additional user input device is cursor control device 280, such as a mouse, a trackball, stylus, or cursor direction keys coupled to bus 245 through bus 265 for communicating direction information and command selections to processor 240, and for controlling cursor movement on display device 270.

Another device, which may optionally be coupled to computer system 230, is a communication device 290 for accessing other nodes of a distributed system via a network. The communication device 290 may include any of a number of commercially available networking peripheral devices such as those used for coupling to an Ethernet, token ring, Internet, or wide area network. Note that any or all of the components of this system illustrated in FIG. 2 and associated hardware may be used in various embodiments of the present invention.

It will be appreciated by those of ordinary skill in the art that any configuration of the system may be used for various purposes according to the particular implementation. The control logic or software implementing the present invention can be stored in main memory 250, mass storage device 225, or other storage medium locally or remotely accessible to processor 240. Other storage media may include floppy disks, memory cards, flash memory, or CD-ROM drives.

It will be apparent to those of ordinary skill in the art that the methods and processes described herein can be implemented as software stored in main memory 250 or read only memory 220 and executed by processor 240. This control logic or software may also be resident on an article of manufacture comprising a computer readable medium having computer readable program code embodied therein and being readable by the mass storage device 225 and for causing the processor 240 to operate in accordance with the methods and teachings herein.

The software of the present invention may also be embodied in a handheld or portable device containing a subset of the computer hardware components described above. For example, the handheld device may be configured to contain only the bus 245, the processor 240, and memory 250 and/or 225. The handheld device may also be configured to include a set of buttons or input signaling components with which a user may select from a set of available options. The handheld device may also be configured to include an output apparatus such as a liquid crystal display (LCD) or display element matrix for displaying information to a user of the handheld device. Conventional methods may be used to implement such a handheld device. The implementation of the present invention for such a device would be apparent to one of ordinary skill in the art given the disclosure of the present invention as provided herein.

Figure 3:
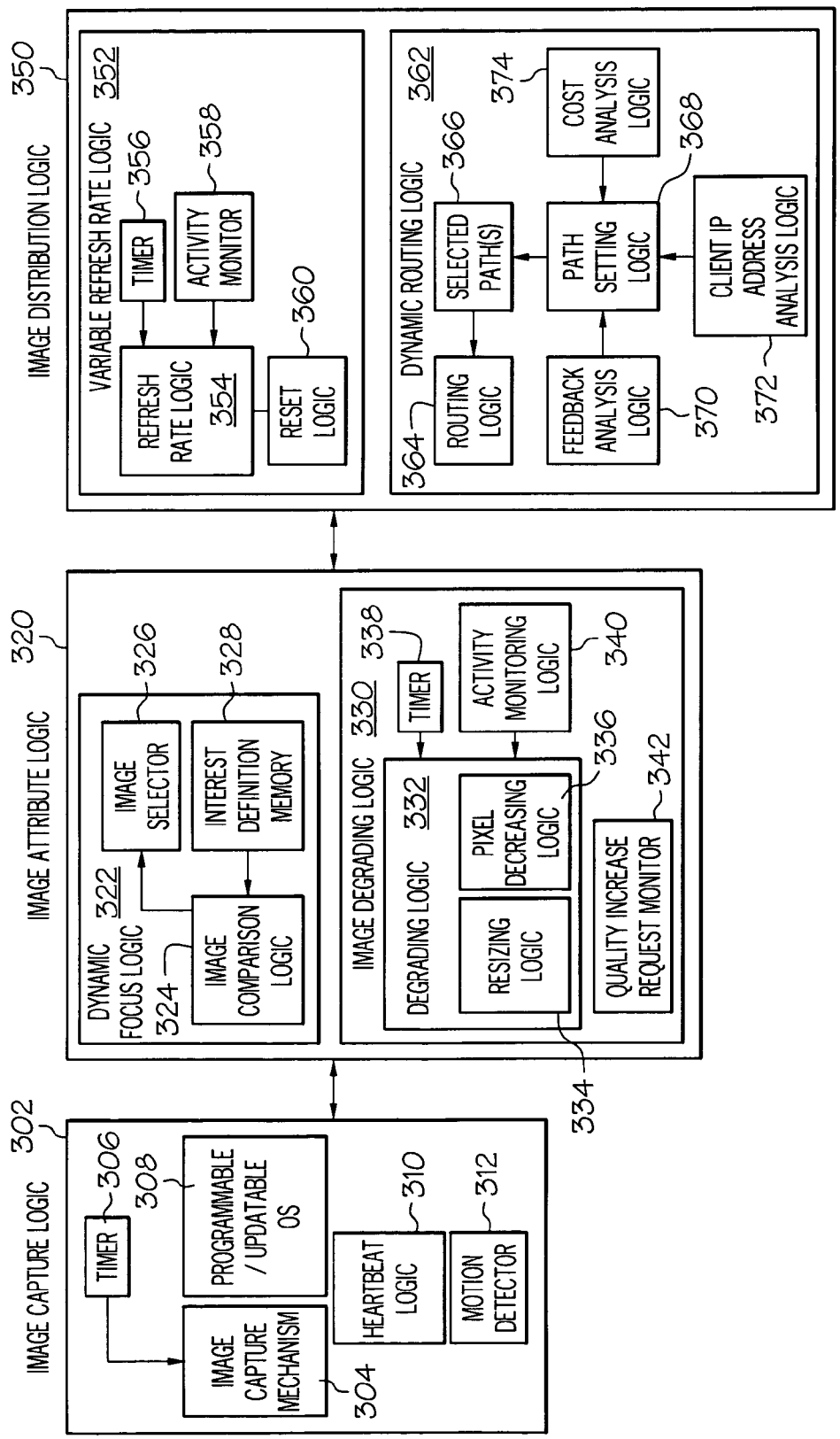
FIG. 3 is a block diagram illustrating one embodiment of a system for image acquisition, processing, and display.

FIG. 3 is a block diagram illustrating one embodiment of a system for image acquisition, processing, and display. The system includes image capture logic 302, image attribute logic 320, and image distribution logic 350. For one embodiment, the image capture logic 302 may be on-site, in the cameras, or in the on-site camera control logic. For one embodiment, the image attribute logic 320 and the image distribution logic 350 may be in the image server.

The image capture logic 302 includes an image capture mechanism 304. The image capture mechanism 304 periodically captures an image, and passes it on. The period is controlled by timer 306. The image capture mechanism 304 passes the captured image to the motion detector 312.

The motion detector 312 identifies whether the new image differs from the old image. If the images differ, the new image is sent on. For one embodiment, the motion detector 312 may be located on the camera itself. For another embodiment, the motion detector 312 may be located on the on-site camera control system. For yet another embodiment, the motion detector 312 may be located on the image server. In that instance, the motion detector 312 is used to determine whether the to update the remote client. In other words, an image displayed to an end-user is only refreshed if the image has changed, as determined by motion detector 312.

For one embodiment, if the motion detector 312 is on the remote site, it is used for discovering camera failures. In that case, if the motion detector 312 has determined that the image is unchanging, over a period, it notifies the heartbeat logic 310, and the heartbeat logic 310 sends an indicator that the camera is still functioning. For one embodiment, the heartbeat logic 310 sends a compressed version of the image and a time stamp. For another embodiment, the heartbeat logic 310 sends only a time stamp. For yet another embodiment, the heartbeat logic 310 may send as little as a single bit, indicating that the camera is functional. The size of the data sent by heartbeat logic 310 is much smaller than the size of the full image. Thus, this saves bandwidth.

The programmable/updateable operating system 308 permits the image server to update the remote sites through the network. This is advantageous since every feature of the camera system from the timer, to the image quality, etc. may be remotely updated. For one embodiment, the updating occurs in response to the camera, or on-site camera control system, sending a request for data identifying a current version of the operating system. For one embodiment, the client, camera or camera control system, may periodically poll the server, to determine whether a new version of any of the software is available. If new material is available, the data is downloaded and installed by the camera/camera control system.

The image capture logic 302 passes the images and/or the heartbeat to the image server.

The image attribute logic 320 includes dynamic focus logic 322 and an image degrading logic 330. Dynamic focus logic 322 includes an image comparison logic 324, which compares the images received from various cameras, while interest definition memory 328 defines what is considered "interesting." For one embodiment, interest definition memory 328 includes a hierarchical list of interest values for various things. Interest values may be assigned, for example, to action, people, and presence of an object of attention. For example, movement over a plurality of frames may be detected, e.g. change over time. For another example, the detection of movement may be combined with the detection of people, e.g. the movement of persons into and out of the frame may be detected. For yet another example, the presence of an object of interest—such as a particular person or object—may be detected.

The image selector 326 determines which images originated by which camera should be displayed to a user. For one embodiment, the image selector includes a hysteresis module, to ensure that focus does not jump all of the time. For example, the image selector 326 is set to switch images either logically, or periodically. Logically switching images, for example, may make sense if there is a particular object of interest that is being displayed. As that object moves around, the camera whose image is being displayed can be switched, to follow that object.

For one embodiment, the image selector 326 further may receive feedback from users. For one embodiment, users are provided multiple images, and may select one of the images to see in a larger window. The selection of the users is then input to the image selection logic 326 to help select the most interesting images. For another embodiment, users may rate the images, for example on a scale of one to ten, and this may be used by the image selector to select images.

The selected image or images are then passed on to the image server, to be served to the user.

The image degrading logic 330 degrades the image sent to a client. Image degrading logic 330 includes a timer 338 and an activity monitoring logic 340. The timer 338 measures how long an image has been displayed to the user. The activity monitoring logic 340 determines whether the client has been using the system, whether the image is covered by other windows, whether the screen saver has turned on, and other similar indications of whether the user is watching the image. The output of timer 338 and activity monitoring logic 340 are input to the degrading logic 332. When a sufficient time has elapsed, or the user has been inactive for a period, the degrading logic 332 degrades the image. The image may be degraded by being resized, using resizing logic 334. The image may be slowly shrunk. For one embodiment, the image may be degraded by decreasing resolution, using pixel logic 336. For one embodiment, both of these features are slowly moved. For example, the image size may be changed gradually from a 4"×6" to 2"×3" over a period of time. For one embodiment, the size degrades exponentially, starting slowly, and getting increasingly worse, over time. For example, an image sent may be decreased for a high quality image of 40K to a lower quality and/or smaller image using only 5K. This translates into an eight-fold reduction in bandwidth use.

The quality increase request monitor 342 responds to a request by the user to increase the image quality. For one embodiment, if an actual request is received, the image quality is increased to the original quality, as is the image size. For one embodiment, if activity is detected, the image quality/size may be gradually increased over time, if activity continues. In this way, if a user fails to close a window, the bandwidth used for the particular user may be significantly decreased. This leads to a cost savings for the image server.

The image distribution logic 350 includes variable refresh rate logic 352 and a dynamic routing logic 362. The variable refresh rate logic 352 is used to reduce the bandwidth of the system, while the dynamic routing logic 362 reduces the cost of the bandwidth being used.

The variable refresh rate logic 352 includes a timer 356 and activity monitor 358. For one embodiment, the timer 356 and activity monitor 358 may be the same timer & activity monitor as used with the image degrading logic 330. The refresh rate logic 354 adjusts the refresh rate, based on the elapsed time and/or lack of activity. As described above, the refresh rate may be decreased gradually. For one embodiment, after a period or a period of inactivity, the refreshing may be stopped completely. In that instance, an overlay image indicating that the refreshing has stopped may be placed over the image. This indicates to the user that he or she may restart refresh. For another embodiment, an indication of the slowed refresh rate is placed in or near the image. The user can request, and the reset logic 360 can activate, the previous faster refresh rate.

The dynamic routing logic 362 permits the images being sent, as original images and as refreshes, to be sent through different routes. Generally, images are delivered to a client in two parts, a container page (for one embodiment HTML) directed to the browser, an embedded image (for one embodiment JPEG or IPX format) periodically refreshed by the container. For one embodiment, the container page is not refreshed to refresh the embedded image. Thus, the container page can be delivered by one content delivery network (CDN), i.e. route, while the image is delivered by another. For one embodiment, the container is refreshed at a slower rate. FIG. 1B illustrates one embodiment of a system including a CDN.

For one embodiment, when the container page is refreshed, it can dynamically select which CDN is used to deliver the embedded image. This selection is made by the routing logic 364. The routing logic 364 enforces the selected path(s) 366.

The selected paths 366 are determined, for one embodiment by an administrator. For smart image-display mechanisms, it is possible to feedback performance information to the server, to help make this CDN selection. Feedback analysis logic 370 receives this feedback and passes this data to path setting logic 368, which places the selected paths 366 in memory.

For another embodiment, the CDN may be changed based on the client IP address, using IP address analysis logic 372. For example, if a company has a server hosted at site X, which has good network connectivity with LAN Y, there is little value in selecting a more expensive CDN rather than the default CDN of the LAN Y. For another embodiment, the path may be selected using cost analysis logic 374, to determine which CDN provides the most cost-effective bandwidth at any time. For example, a CDN may provide a certain bandwidth level at a first price, while bandwidth above that level is charged at a second price. The cost analysis logic 374 may analyze this data regarding the cost of bandwidth, and pass the selection to the path setting logic 368.

The path setting logic 368, for one embodiment, may be set to prefer certain data above others. For example, for certain users of the NetCam, the quality and speed of service is of ultimate importance. Other users may prefer slightly slower system, for a lower cost. This may be taken into account by the path setting logic 368, to select a path for routing logic 364.

Figure 4:
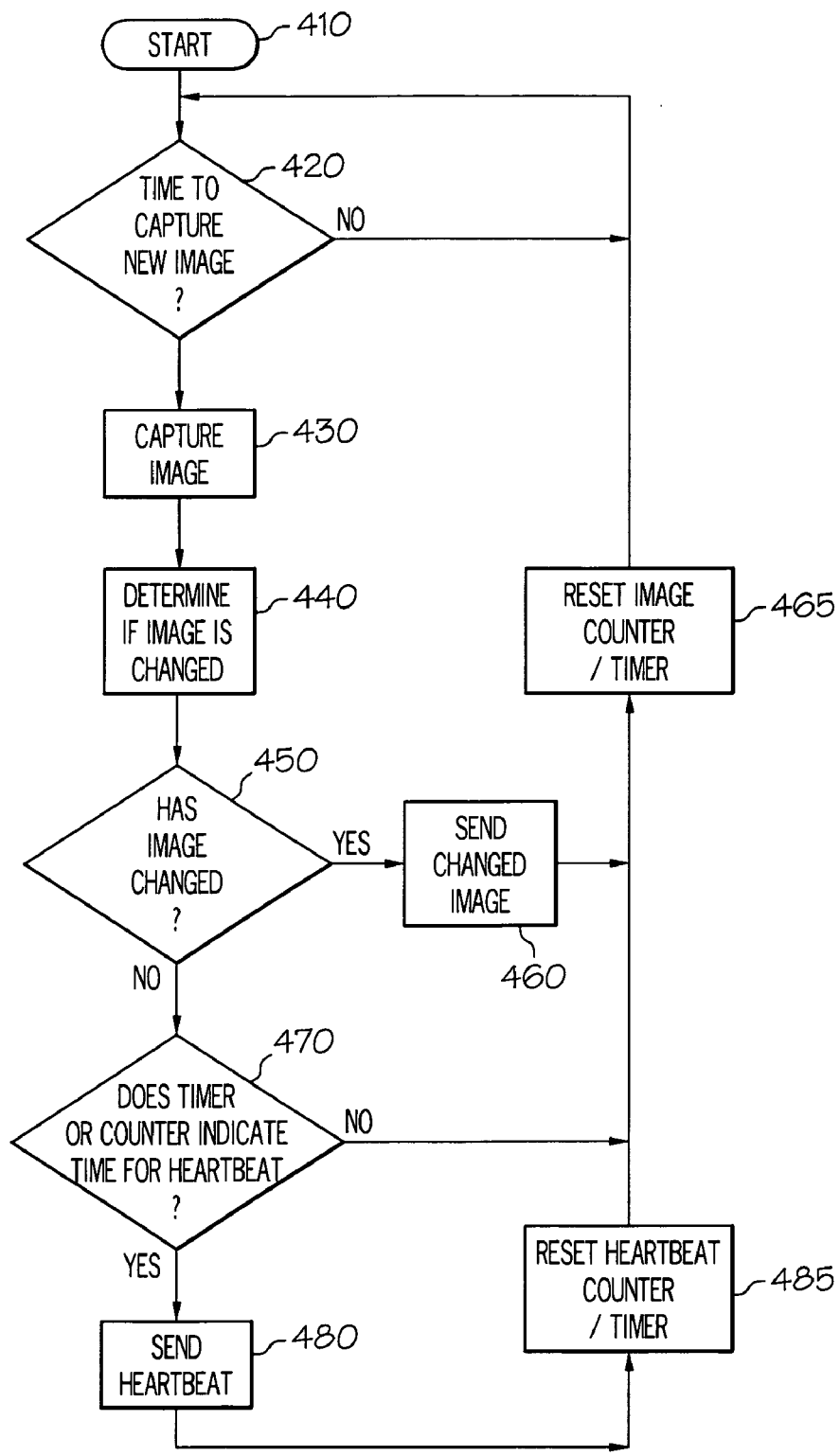
FIG. 4 is a flowchart of one embodiment of a heartbeat mechanism.

FIG. 4 is a flowchart of one embodiment of a heartbeat mechanism. The process starts at block 410. For one embodiment, this process starts when the system is turned on, or when the heartbeat mechanism is first enabled.

At block 420, the process determines whether it is time to capture a new image. If it is not yet time to capture a new image, the process returns to block 420. For one embodiment, this is not a loop, but rather at timer that sends an affirmative command (e.g. take picture now.) If it is time to take a new image, the process continues to block 430.

At block 430, an image is captured.

At block 440, the process determines whether the image has changed, compared to a previously captured image. For one embodiment, this is a motion detection, which merely determines the difference between the two images. If the difference is above a threshold, then the image is considered to have changed. Otherwise, the image is considered the same. For one embodiment, this process may take place within the camera itself. For another embodiment, this process may take place in the on-site camera control mechanism. In either case, this process is done on-site, prior to sending an image to the image server, and thus consuming bandwidth.

At block 450, the process determines whether the image has changed. If the image has changed, the changed image is sent, at block 460. For one embodiment, the changed image is sent to the image server. For another embodiment, the changed image is sent to the on-site camera management system, for further processing. This further processing may include dynamic focusing, as will be discussed below, and/or other types of processing. The process then resets the timer at block 465, and returns to block 420, to await the next time when it is time to take a new image.

If the image has not changed sufficiently, the process continues to block 470. At block 470, the process determines whether the timer or counter that indicates that it is time for a new heartbeat has expired. For one embodiment, heartbeats occur periodically, if no images are sent. For example, if images are normally sent every 5 seconds, then every 30 seconds in which no new image has been sent a heartbeat is sent. For another embodiment, a counter tracks how many images have been captured but have not been sent. For one embodiment, a heartbeat is sent after a certain number, f.e. ten, images have been captured but not sent. This counter and/or timer is tested. If the timer indicates that it is not yet time for a heartbeat, the process returns to block 420. The timer for image capture is reset at block 465, but the counter, if one is used, for heartbeats is incremented.

If the timer/counter indicates that it is time for a heartbeat, the process continues to block 480.

At block 480, the heartbeat is sent. For one embodiment, the heartbeat is a compressed version of the image, including a time-stamp. For another embodiment, the heartbeat is another type of data, which indicates that the camera is functioning. The size of the heartbeat, in general, is substantially smaller than the size of the actual image. Thus, for example, compared to a 40K actual image, the heartbeat that is sent may be 5K. The eight-fold reduction in bandwidth used, plus the reduction due to the lesser frequency of the heartbeats, reduces the cost of the image considerably. Thus, even if a heartbeat is sent for every image (i.e. the heartbeat counter is set to one, or the heartbeat timer is set to the same as the image timer), the bandwidth use is substantially reduced.

The process then resets the heartbeat counter/timer at block 485, resets the image counter at block 465, and returns to block 420, to await the next image.

Figure 5:
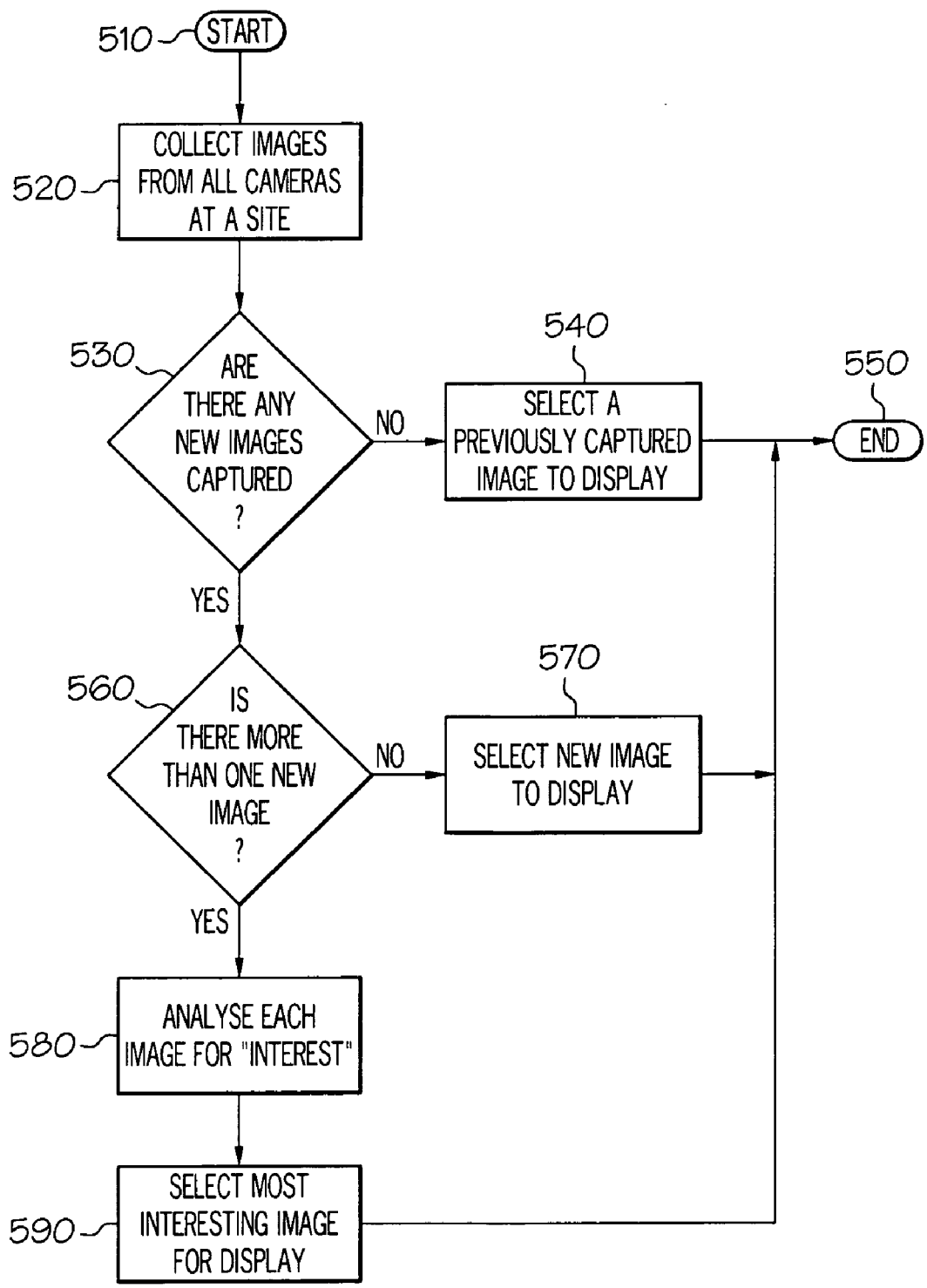
FIG. 5 is a flowchart of one embodiment of a dynamic focus mechanism.

FIG. 5 is a flowchart of one embodiment of a dynamic focus mechanism. The process starts at block 510. At block 520, the system collects images from all cameras at a site. For one embodiment, the system in this process is the on-site camera management system. For another embodiment, the system may be the image server, and the images may be collected over a network. For one embodiment, these images include all of the images that have changed, as described above.

At block 530, the process determines whether any new images have been captured. As discussed above, for one embodiment, the images may be identical to the previously captured images. In that case, the answer here would be no. If no new images have been captured, the process continues to block 540.

At block 540, a previously captured image is selected for display. For one embodiment, if this occurs at the on-site system, instead of sending an actual image, an image identifier may be sent up. This would further reduce the bandwidth usage. The process then ends at block 550.

If, at block 530, at least one new image was found, the process continues to block 560.

At block 560, the process determines whether there was more than one new image. If there is only one new image, at block 570, the one new image is selected as the image to display, and the process ends at block 550. Otherwise, the process continues to block 580.

At block 580, the new image(s) are analyzed for interest. The potential factors of interest were discussed above. For one embodiment, the image is designed not to change too often. Thus, the image analysis may take into account the last time the image changed, and whether the cameras are following an object of interest. The most interesting, and most clearly logically fitting, image is selected.

At block 590, the most interesting image is selected for display. The process then returns to block 550, and ends.

Figure 6:
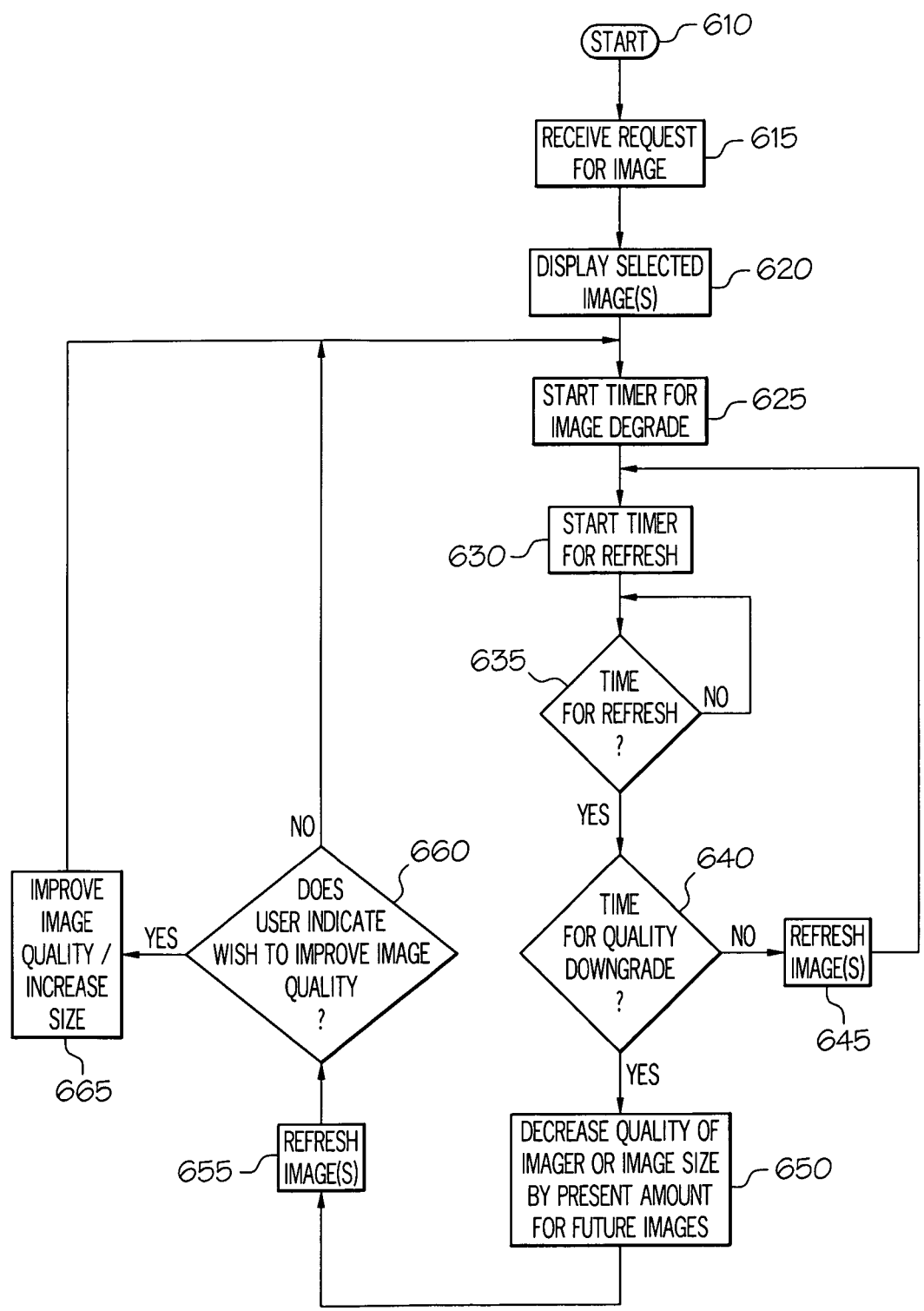
FIG. 6 is a flowchart of one embodiment of image display quality adjustment.

FIG. 6 is a flowchart of one embodiment of image display quality adjustment. The process starts at block 610.

At block 615, a request for an image is received. For one embodiment, this is received when a user selects a "view NetCam image" or similar button or mechanism. The web server that hosts the user then passes this request on to the image server. For another embodiment, the web server that hosts the user may directly handle the image requests, in which case the following flow is executed by the hosting web server.

At block 620, the selected images are displayed. For one embodiment, the user may select a single image, or multiple images for display. For one embodiment, a new window is opened when the user requests these image(s), and the new window includes the selected images.

At block 625, a timer is started for the image degradation. For one embodiment, the timer simply times how long the image has been displayed for the user. For another embodiment, the timer is movement dependent, and times how long the user has been inactive and/or the image has not been on top of the user's display screen.

At block 630, the timer for the refreshing of the image is started. As discussed above, the images are periodically refreshed. This period is, for one embodiment, set by a timer.

At block 635, the system waits until it is time for an image refresh. In general, the image can only be altered upon refresh. However, a non-refreshed image does not require additional bandwidth.

If it is time for a refresh, the process continues to block 640. At block 640, the process determines whether it is time for image degradation. As discussed above, this may be a function of user activity or time. If it is not yet time for image degradation—i.e. the user has not been inactive for an extended period—the process continues to block 645. At block 645, the image is refreshed, and the process returns to block 630, to restart the timer for the refresh cycle.

If it is time for image degradation, the process continues to block 650. At block 650, the image is degraded. The image may be degraded by decreasing the quality (e.g. number of pixels) of the image, or by decreasing the size of the image, or by another means. This sets the quality for future images.

The process then continues to block 655, where the image is refreshed, with the new, lower quality/size. The process then continues to block 660.

At block 660, the process determines whether the user has indicated a wish to improve the quality of the image. For one embodiment, the image quality may be increased, to the original level and potentially beyond, by user request. For one embodiment, this may be done at any time when the image is available to the user. If the user does wish to improve the image, the process continues to block 665, and the image quality is improved for subsequent images. For one embodiment, the image is immediately refreshed, to reflect the new, improved image quality. The process then returns to block 625, to reset the timer for the image degradation. If the user does not wish to improve the image quality, the process returns directly to block 625.

Figure 7:
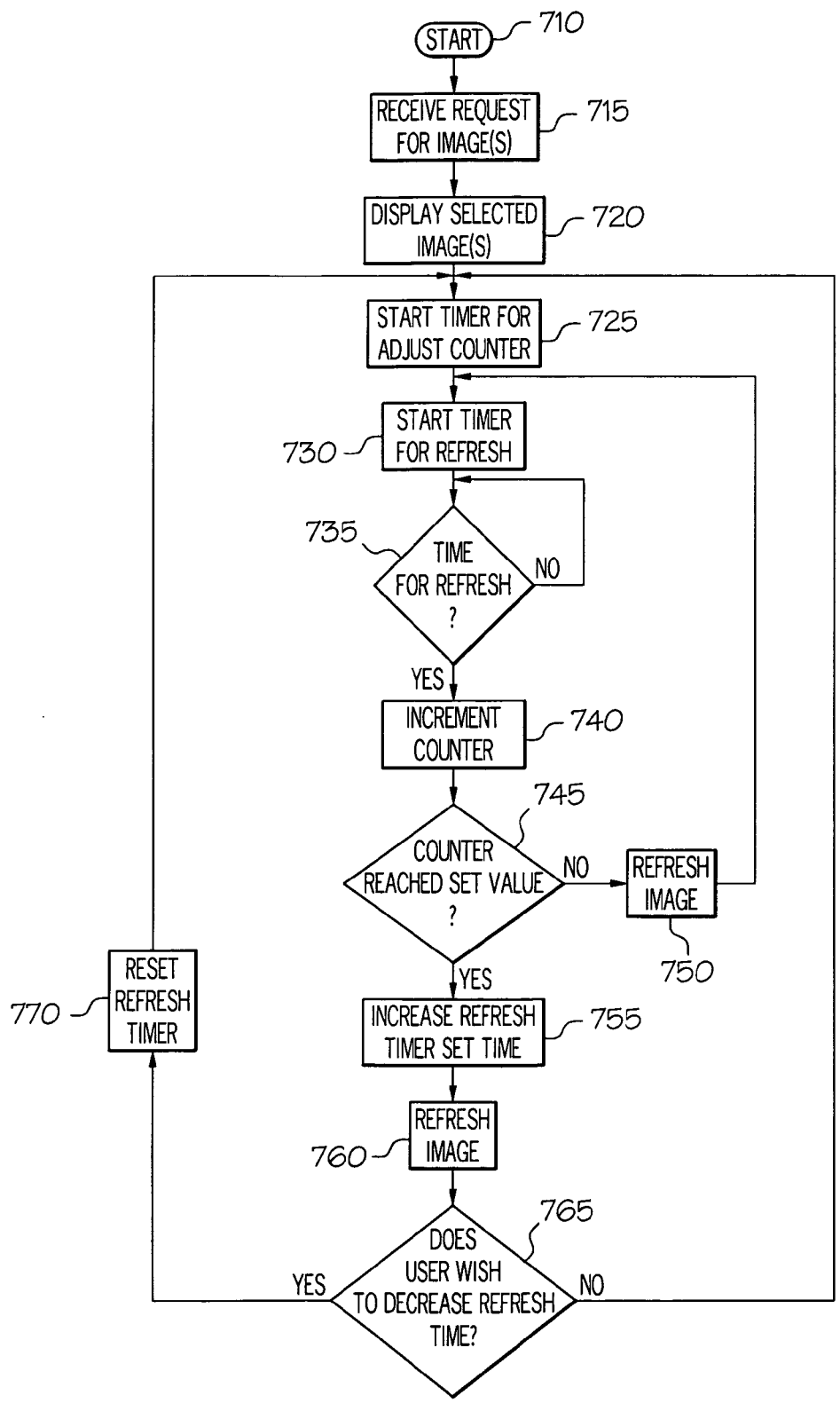
FIG. 7 is a flowchart of one embodiment of image refresh adjustment.

FIG. 7 is a flowchart of one embodiment of image refresh frequency adjustment. The process starts at block 710. A request for an image or images is received at block 715, and the selected image is displayed at block 720.

At block 725, the timer for the adjustment in refresh frequency is started. For one embodiment, the refresh frequency is evaluated periodically. For one embodiment, this period may be set by counting the number of refreshes that occur. For another embodiment, this period may be determined by time. The description below assumes the use of a counter. However, one skilled in the art would understand how to modify this process to use a timer.

At block 730, the refresh timer is started. For one embodiment, the refresh timer determines when the image displayed to the user is refreshed. For one embodiment, the refresh time is 5 seconds.

At block 735, the process determines whether it is time to refresh the image. If it is not yet time to refresh the image, the process waits. For one embodiment, this may be an interrupt driven process. Thus, the system is not actually performing a processing loop. If it is time to perform a refresh, the process continues to block 740.

At block 740, the counter for the refresh frequency tester is incremented. For one embodiment, if instead of a counter a timer is used, this step may be skipped.

At block 745, the process determines whether the counter, which indicates it is time to re-evaluate the refresh frequency, has reached a preset value. For one embodiment, every forty-eight refreshes (e.g. 5 seconds*48=240 seconds=4 minutes), the refreshes are re-evaluated. It is to be understood that the refresh re-evaluation may occur on every refresh, once an hour, or at any other rate. If a timer is used, instead of a counter, the timer may be tested to determine whether the preset time has been reached.

If the counter has not yet reached the value for re-evaluation, the process continues to block 750, and the image is refreshed. The process then returns to block 730, to once again start the refresh counter.

If the counter has reached the value for re-evaluation, the process continues to bock 755. At block 755, the refresh frequency is increased. For one embodiment, the refreshes are completely stopped. For another embodiment, the refreshes are decreased. For one embodiment, refreshes are gradually decreased, e.g. from every five seconds, to every 10 seconds, to every 20 seconds, etc. For one embodiment, the re-evaluation counter/timer may also be adjusted, to decrease the refresh frequency more frequently, as time goes on. For one embodiment, the refresh frequency reduction is exponential, with larger steps closer together, as time goes. At block 760, the image is refreshed.

At block 765, the process determines whether the user wishes to increase the refresh frequency. For one embodiment, as the refresh frequency is decreased, an indication is shown to the user. The user can speed up the refresh frequency by selecting the indication. For example, there may be a button, requesting a faster refresh rate. If the user does not wish to increase the refresh frequency, the process returns to block 725, and re-starts the timer/counter for the refresh frequency evaluation. For one embodiment, the timer/counter may be initiated to a lower value, to have a shorter evaluation period in each subsequent cycle. For one embodiment, when the refresh frequency reaches a value such as five minutes, the refreshes are completely stopped. At that point, this process stops, and waits for the user to increase the refresh frequency or close the window. However, until the refresh frequency is set to zero (e.g. no further refreshes), this loop continues.

If, at block 765, the user wishes to increase the frequency of refreshes, the process continues to block 770. At block 770, the refresh frequency is reset. For one embodiment, the user can indicate the refresh frequency preferred, i.e. the original frequency, or a slower frequency. For one embodiment, there is a slider-bar that the user may use to adjust the refresh frequency. For one embodiment, the re-evaluation of the refresh frequency is also reset to the previous rate. For one embodiment, the user's intervention resets the system to its "new image" state, and the image refresh degradation proceeds as described above.

The process then returns to block 725, to restart the frequency adjustment counter.

This process may, for one embodiment, depend on the combination of a timer/counter and user activity. Thus, for example, the timer/counter may be halted, or reset, when the user moves the window in which the image resides to the front of the screen, or otherwise indicates active observation of the image. For another embodiment, the timer/counter does not start until the user has been inactive for a period, or if the user covers up or minimizes the window in which the image resides. For yet another embodiment, the refresh rate immediately varies with the user's attention. Thus, there is no refreshes occurring when the image is covered, and the refresh rate is reset to the "new image" refresh rate when the user uncovers the image. In the context of the above flowchart, the frequency evaluation counter/timer is set to evaluate user activity on every refresh, and the user bringing the window forward is interpreted as a request to reset the refresh frequency.

In this way, the bandwidth used for an image is reduced, if the user fails to close the window in which the image resides for an extended period of time, while maintaining the same refresh rates if the user is actively observing the activity shown in the image.

Figure 8:
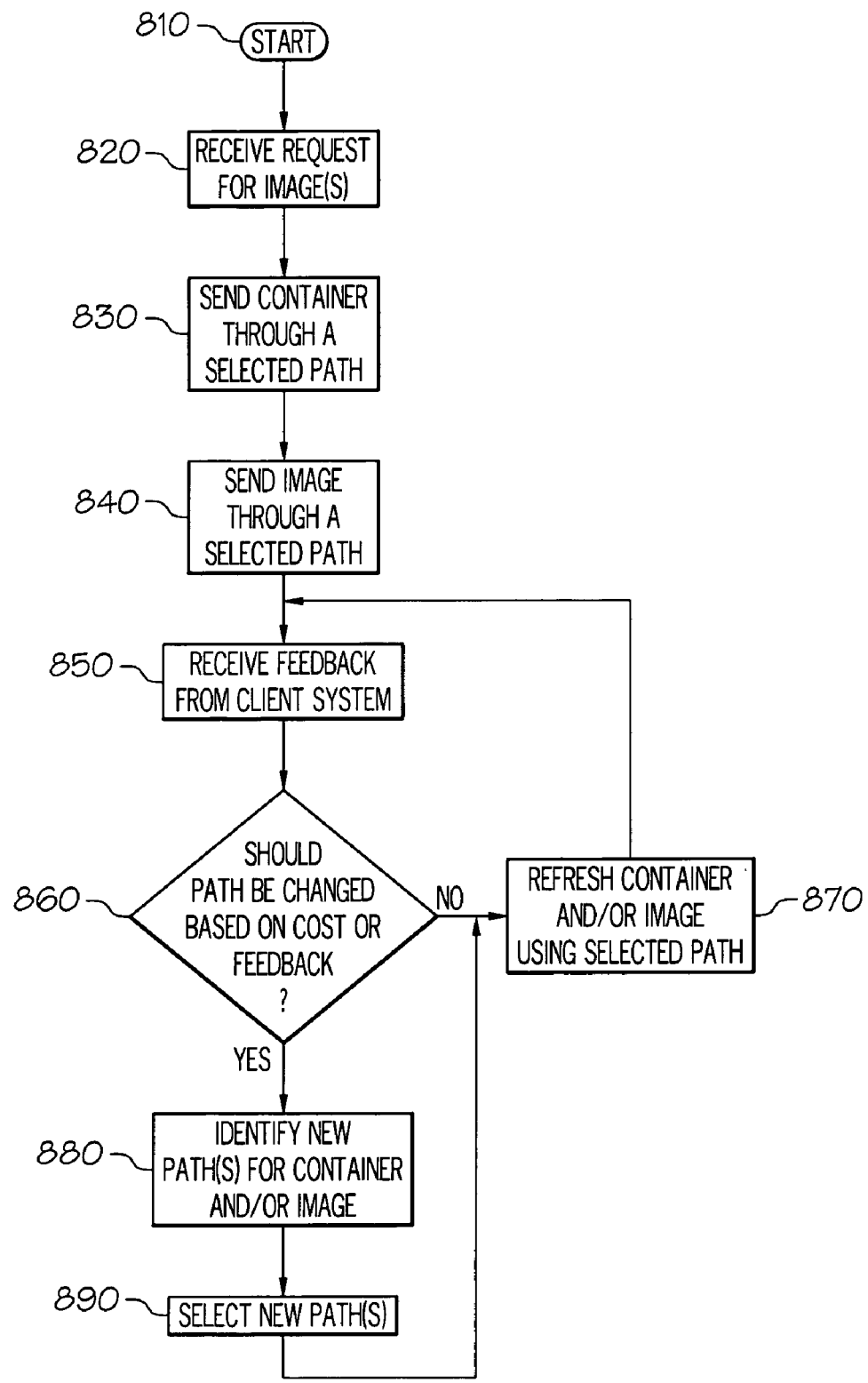
FIG. 8 is a flowchart of one embodiment of using dynamic routing.

FIG. 8 is a flowchart of one embodiment of using dynamic routing. Dynamic routing is used to reduce the cost and time associated with delivering an image to a client. The process starts at block 810.

At block 820, a request is received for the image. For one embodiment, data is sent to the client in two portions. The data is sent as a container, at block 830, and as an image within the container, at block 840. For one embodiment, the container is an HTML page, which includes an image with refresh instructions. For one embodiment, the image is a JPEG or similar image format. For one embodiment, the container uses a JavaScript or similar format to load the image.

At block 850, the system receives feedback from the client system, regarding the image delivery and/or update. For one embodiment, the feedback indicates how fast the image loaded, what the lag time was, etc. For one embodiment, the feedback may be optional, if JavaScript or a similar active system is used. Otherwise, this step may be skipped. For one embodiment, feedback may also be logged from the image serving system, indicating how long it took to load the image, etc. For one embodiment, the feedback system further uses the data from the user's request, such as the user's IP address, as well.

At block 860, the process determines whether the path should be changed for the subsequent refresh(es) of the image. For one embodiment, this determination occurs when the container is refreshed. For one embodiment, the container is refreshed periodically, as is the image. For one embodiment, the container is refreshed less frequently than the image. Thus, whenever the container is refreshed, it may choose to deliver the image for the subsequent refreshes through a different path.

For one embodiment, this determination is made by considering one or more of the following factors: cost of image delivery, speed of image delivery, client location, and client characteristics such as importance and frequency of viewing images.

If, at block 860, the process chooses not to change the path, the process continues to block 870. At block 870, the container is refreshed, using the selected path. For one embodiment, the container and image paths are not changed. The process then returns to block 850, to receive further feedback from the user.

If, at block 860, it is decided to send the container and/or the image through a new path, the process continues to block 880.

At block 880, the new path is identified for the container and/or the image. The new path is set for the container and/or image, at block 890. For the container, the system simply sends the refreshed container through the new path. For the image, the container code is altered, so that the new path is specified for the further refreshes of the image. The process then continues to block 870, where the container and/or image are refreshed using the new path(s). Note that the paths for the container and the image need not be the same. Thus, for example, a slower path may be used for the image, and a faster one for the container. Alternatively, a cheaper path may be used to send the larger image, while a more expensive and faster path is used to send the smaller container. Similar trade-offs may be made.

The above description provides numerous methods to increase reliability and reduce the cost of hosting web cams. This allows a hosting provider to increase the average quality of images, without increasing costs. Thus, using the above techniques, the hosting provider can increase the standard refresh rate, or standard image quality, e.g. offer 50K images refreshed at 5 seconds, for the same cost as previously offering 10K images refreshed at 5 minute intervals.

The methods described above include sending a heartbeat to indicate that the camera is functional; selecting one of multiple images to send and/or display; degrading a refresh rate, an image quality or an image size over time to reduce bandwidth use; and sending the image over a different path depending on certain factors. All of these methods may be used separately or together, to reduce the cost to the hosting provider and increase reliability of providing such Net Cam images to a user.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A method for refreshing an image, the method comprising:

(a) capturing an image with a camera;

(b) sending the image to a user's computer system;
(c) refreshing the image, the step of refreshing the image comprising:
   (i) capturing a refreshed image with the camera, and
   (ii) sending the refreshed image to the user's computer system, wherein at least a portion of the step of refreshing the image is performed when a refresh period has elapsed;
(d) determining whether to increase the refresh period, wherein the step of determining whether to increase the refresh period comprises determining
   whether the image is visually obstructed on the user's computer system, wherein the act of determining whether the image is visually obstructed on the user's computer system comprises determining whether the image is covered by a window
(e) increasing the refresh period in response to determining that the image is visually obstructed on the user's computer system.

2. The method of claim 1, wherein the step of increasing the refresh period comprises increasing the refresh period along an exponential curve.

3. The method of claim 1, wherein at least a portion of the step of refreshing the image is no longer performed after a second period of time has elapsed.

4. The method of claim 3, further comprising visually indicating to the user that refreshing has stopped, wherein the act of visually indicating is performed after the second period of time has elapsed.

5. The method of claim 1, wherein the step of determining whether to increase the refresh period is performed periodically.

6. The method of claim 5, wherein the period for determining whether to increase the refresh period is greater than the refresh period.

7. The method of claim 1, wherein the step of determining whether to increase the refresh period is performed when the refresh period has elapsed.

8. The method of claim 1, wherein the step of determining whether to increase the refresh period is performed when a timer reaches a preset value.

9. The method of claim 1, wherein the step of determining whether to increase the refresh period is performed when a counter reaches a preset value.

10. The method of claim 1, further comprising permitting the user to change the refresh period.

11. An apparatus to refresh an image, the apparatus comprising:
(a) a network connection, wherein the network connection is operable for communicating images from a camera to a user's computer system;
(b) a refresh logic configured to refresh an image captured by the camera upon lapse of a refresh period, the refresh logic being configured to refresh an image by sending a refreshed image to the user's computer system via the network connection;
(c) a refresh rate logic in communication with the refresh logic, wherein the refresh rate logic is configured to determine whether the refresh period should be changed, the refresh rate logic being further configured to change the refresh period in response to a determination that the refresh period should be increased, wherein the refresh rate logic is in communication with an activity monitor configured to monitor activity of the user, wherein the refresh rate logic is configured to determine whether the refresh period should be changed based at least in part on one or more communications from the activity monitor, wherein the activity monitor is configured to monitor:
   whether the image is visually obstructed on the user's computer system.

12. The apparatus of claim 11, wherein the refresh period is set to infinity after a certain period of time has elapsed.

13. The apparatus of claim 11, wherein the refresh rate logic is configured to communicate with the refresh logic periodically.

14. The apparatus of claim 11, wherein the refresh rate logic is configured to periodically determine whether the refresh period should be changed.

15. The apparatus of claim 11, wherein the activity monitor is configured to determine at:
   whether a window displaying the image is visually obstructed by another window.

16. A method for refreshing an image, the method comprising:
(a) capturing an image with a camera;
(b) sending the image to a user's computer system;
(c) refreshing the image, the step of refreshing the image comprising:
   (i) capturing a refreshed image with the camera, and
   (ii) sending the refreshed image to the user, wherein at least a portion of the step of refreshing the image is performed when a refresh period has elapsed;
(d) determining whether to increase the refresh period, wherein the step of determining whether to increase the refresh period comprises determining whether the image is visually obstructed on the user's computer system; and
(e) increasing the refresh period in response to determining that the image is visually obstructed on the user's computer system.

17. The method of claim 16, further comprising
(f) counting the number of times the step of refreshing the image has been performed; and
(g) increasing the refresh period when the step of refreshing the image has been performed a certain number of times.

* * * * *

UNITED STATES PATENT AND TRADEMARK OFFICE
CERTIFICATE OF CORRECTION

PATENT NO. : 7,015,949 B1
APPLICATION NO. : 09/835033
DATED : March 21, 2006
INVENTOR(S) : Sah, Adam D.

Page 1 of 1

It is certified that error appears in the above-identified patent and that said Letters Patent is hereby corrected as shown below:

Column 14,
Lines 13-14, "...configured to monitor: whether...", delete and replace with,
-- ...configured to monitor whether... --.

Signed and Sealed this

Twenty-seventh Day of June, 2006

JON W. DUDAS
*Director of the United States Patent and Trademark Office*